(12) United States Patent
Popat et al.

(10) Patent No.: US 9,507,729 B2
(45) Date of Patent: Nov. 29, 2016

(54) METHOD AND PROCESSOR FOR REDUCING CODE AND LATENCY OF TLB MAINTENANCE OPERATIONS IN A CONFIGURABLE PROCESSOR

(71) Applicant: Synopsys, Inc., Mountain View, CA (US)

(72) Inventors: Kaushik L. Popat, Pleasanton, CA (US); Vineet Gupta, Raipur (IN); Martin Kite, Edgeware (GB)

(73) Assignee: Synopsys, Inc., Mountain View, CA (US)

( * ) Notice: Subject to any disclaimer, the term of this patent is extended or adjusted under 35 U.S.C. 154(b) by 302 days.

(21) Appl. No.: 14/503,152

(22) Filed: Sep. 30, 2014

(65) Prior Publication Data

US 2015/0095611 A1    Apr. 2, 2015

(30) Foreign Application Priority Data

Oct. 1, 2013   (IN) .......................... 4464/CHE/2013

(51) Int. Cl.
*G06F 12/00*      (2006.01)
*G06F 12/10*      (2016.01)

(52) U.S. Cl.
CPC ....... *G06F 12/1027* (2013.01); *G06F 12/1036* (2013.01)

(58) Field of Classification Search
None
See application file for complete search history.

(56) References Cited

U.S. PATENT DOCUMENTS

| 2006/0224857 | A1* | 10/2006 | O'Connor | G06F 12/126 711/202 |
| 2008/0301398 | A1* | 12/2008 | Falik | G06F 12/1009 711/206 |
| 2009/0119089 | A1* | 5/2009 | Gheith | G06F 9/45537 703/23 |

* cited by examiner

*Primary Examiner* — David X Yi
*Assistant Examiner* — Craig Goldschmidt
(74) *Attorney, Agent, or Firm* — Fenwick & West LLP

(57) ABSTRACT

A memory management unit (MMU) is disclosed for storing mappings between virtual addresses and physical addresses. The MMU includes a translation look-aside buffer (TLB) and a memory management unit controller. The TLB stores mappings between a virtual address and a physical address. The MMU controller receives a request to insert an entry into the TLB and performs a set of operations based on the received request. The MMU controller determines whether an entry stored in the TLB is associated with the virtual address of the request, removes the entry stored in the TLB that is associated with the virtual address and inserts the requested entry into the TLB.

16 Claims, 7 Drawing Sheets

On write of Command register, hardware performs:

```
JTLB:
    if (PD0.SZ==Size0)    Issue Delete Entry uOp to 4-way NTLB (normal page TLB)
    if (PD0.SZ==Size1)    Issue Delete Entry uOp to STLB (super-page TLB)
    Issue Delete Entry uOp to ITLB
    Issue Delete Entry uOp to DTLB
```
410

Any of NTLB (at indexed set), STLB, ITLB and DTLB which receive Delete Entry uOp:

```
Lookup entry
if (match) delete all matching entries
if (match multiple entries)
    raise exception (machine check)
    exit
```
420

FIG. 4

METHOD AND PROCESSOR FOR REDUCING CODE AND LATENCY OF TLB MAINTENANCE OPERATIONS IN A CONFIGURABLE PROCESSOR

CROSS REFERENCE TO RELATED APPLICATIONS

This application claims the right of priority based on Indian Provisional Patent application serial no. 4464/CHE/2013, filed Oct. 1, 2013, which is incorporated by reference in its entirety.

BACKGROUND

1. Field of Art

The present disclosure generally relates to the field of processor systems and related components used in such systems. In particular, the disclosure relates to reducing the overhead of translation look-aside buffers maintenance operations.

2. Description of the Related Art

Many processor or computer systems utilize cache memories to enhance compute performance. Cache memory is a memory type that is fast, limited in size, and generally located between a processor and a primary system memory. The speed of a processor in accessing data is significantly improved when the processor loads or stores data directly from the cache memory, referred to as a "hit," instead from system memory (e.g., dynamic random access memory DRAM) that has slower transfer rates (latency). To reduce the frequency by which the processor accesses data stored in system memory, the majority of all processors maintain a subset of the data stored in system memory in cache memory. In the case when the process requests data not stored in cache memory, referred to as a "miss," the processor retrieves the data from the system memory and accordingly updates the cache memory.

Processes executing on a processor do not distinguish between accessing cache memory or other memory, where the operating system, e.g. the kernel, is handing the scheduling, load balancing, and physical access to all the memory available on particular system architecture. To efficiently manage memory, programs are assigned to a memory location based on a virtual not physical memory space. The operating system maps virtual memory addresses used by the kernel and other programs to physical addresses of the entire memory. The virtual address space includes a range of virtual addresses available to the operating system that generally begin at an address having a lower numerical value and extend to the largest address allowed by the system architecture and is typically represented by a 32-bit address.

The translation from virtual address to physical address is stored in a section of memory called the page table. When a process requests to read data from a specific virtual address, the corresponding physical address is determined and the data from the determined physical address is retrieved. The mapping from the requested virtual address to the corresponding physical address is found in the page table of memory. Alternatively, the mapping, represented as page table entries, may be found in a local cache of the page table called the translation look-aside buffer (TLB). In some implementations, the contents of a TLB are software managed (e.g., page table entries stored in the TLB are managed by the operating system of the computing system). In other implementations, the contents of the TLB are hardware managed (e.g., page table entries stored in the TLB are managed by the processor). Software managed TLBs possess greater flexibility than hardware managed TLBs, while hardware managed TLBs operate faster than software managed TLBs. The flexibility of software managed TLBs allows the usage of the TLB with multiple memory configurations, while the speed of hardware managed TLBs allows the usage of TLBs in high performance and high speed computing systems. Therefore, there is a need for a TLB that has the flexibility of a software managed TLB, while achieving comparable performance compared to a hardware managed TLB.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4 illustrates the steps executed by the memory management unit when deleting a TLB entry, according to one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
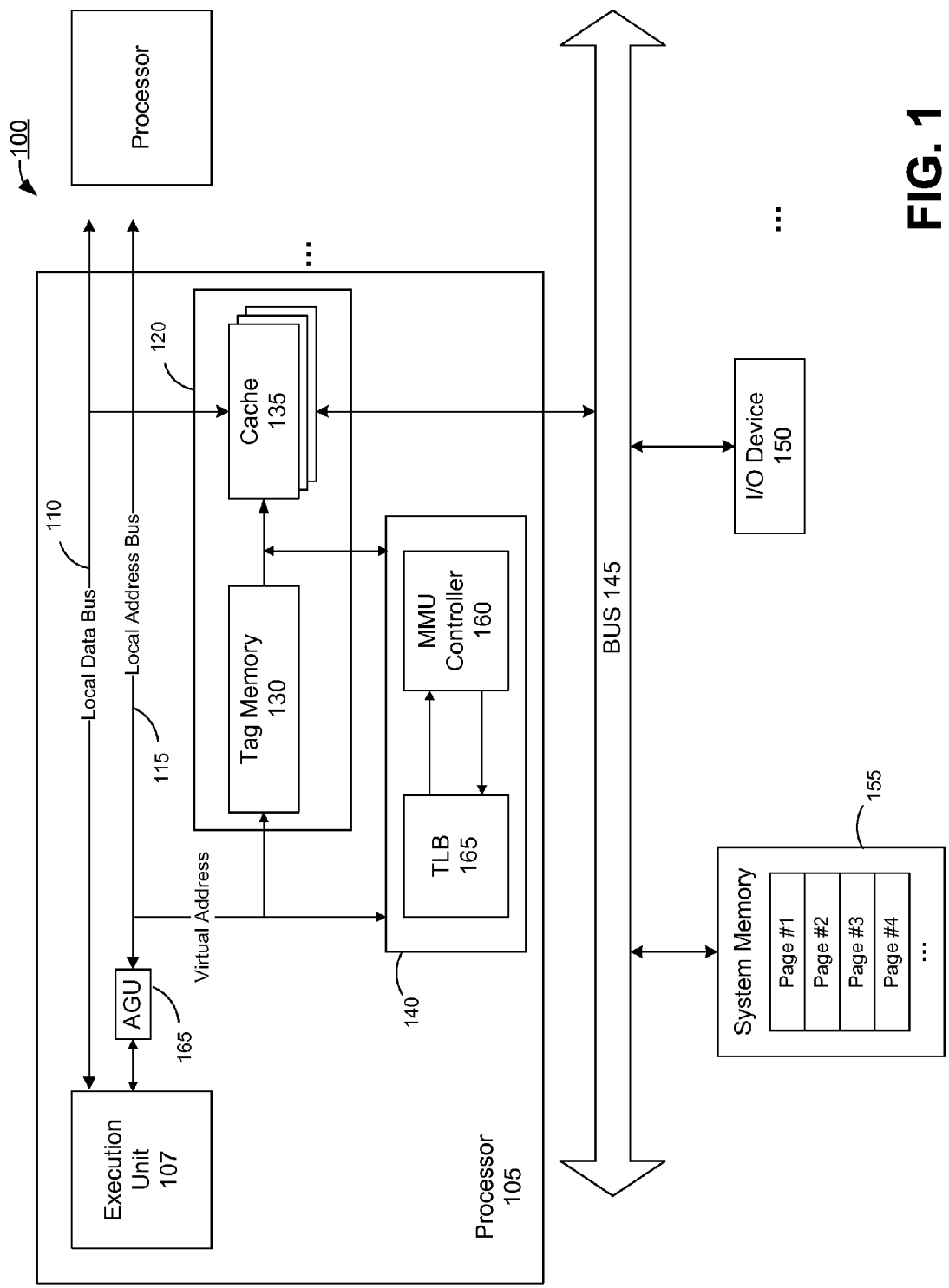
FIG. 1 is high level block diagram depicting a computer system, according to one embodiment.

FIG. 1 is a high level block diagram illustrating one embodiment of a computer system 100 including a cache memory system. The computer system 100 includes a processor 105 that is connected to system bus 145. Processor 105 includes an execution unit 107 that is connected to a local data bus 110 and a local address bus 115. The execution unit 107 is generally configured to execute instructions (e.g., code or software). The processor 105 may be a specialized processor in that it is customizable to include memories, caches, arithmetic components, and extensions. The processor 105 may be programmed to operate as a reduced instruction set computing (RISC) processor, digital signal processor (DSP), graphics processor unit (GPU), applications processor (e.g., a mobile application processor), video processor, or a central processing unit (CPU) to access memory map, and exchange commands with other computing devices. In some embodiments, the processor 105 includes a pipeline. The pipeline includes multiple data processing stages connected in series. The processor 105 may be a single or multiple processor cores represented in an electronic format. In one example, the processor 105 is a configurable processor core represented in circuit description language, such as register transfer language (RTL) or hardware description language (HDL). In another example the processor 105 may be represented as a placed and routed design or design layout format (e.g., graphic data system II or GDS II). In a further example, the processor 105 may be configured to implement methods for reducing the overhead of translation look-aside buffers maintenance operations consistent with the methods described in this disclosure and embodied in silicon or otherwise converted into a physical device.

In one embodiment, the local data bus 110 and local address bus 115 are combined to a single local bus that transmits both data and addresses to and from the execution unit 105 to other component of the computer system 100. The computer system 100 is further provided with local cache memory 120. The local cache memory 120 consists of tag memory 130, and cache memory 135, each connected to the execution unit 107 via the local data bus 110 and local address bus 115, respectively. The execution unit 107 also communicates with the memory management unit (MMU) 140 through the local address 110, which in turn is communicatively coupled to the system bus 145. In contrast to virtual address signals being transmitted along the local address bus 115, data and control signals from the execution unit 107 are transmitted along the local data bus 110 to the cache memory 135, and finally to the system bus 145. In one embodiment (not shown), the system bus 145 is divided into a system address bus and a data system data bus with the former dedicated to transmitting address signals and the latter to data and control signals.

The system bus 145 also connects to a plurality of other input and/or output (IO) devices 150 that allow the processor 105 access to IO data streams and network interface devices (not shown) that connect the computer system 100 to external networks (not shown). Other devices (not shown) that are communicatively coupled to the processors 105 and components of computer system 100 via the system bus 145, include, but are not limited to, graphic displays, pointer control devices, storage unit modules, signal generating devices, alpha-numeric input devices, such as keyboards or touch-screens. Finally, the system bus 145 connects to the system memory 155. In one embodiment, the system memory 155 is partitioned into memory pages, each memory page containing a continuous block of memory of defined length and being addressed through the page's physical address on the system bus 145. Since code or programs executed on the execution unit 107 generally utilize addresses from the virtual address space, the MMU 140 needs to translate the virtual address into the physical page address if the computer system requests access to the corresponding memory page of the system memory 155.

The tag memory 130 is connected to MMU 140 and the cache memory 135. The MMU 140 contains the MMU controller 160 and the translation look-aside buffer (TLB) 165 that operate in conjunction translate a virtual memory address to the corresponding physical address of the system memory 155. In general, the tag memory 130 contains a plurality of entries corresponding to entries in cache memory 135. Each tag memory 130 entry is indexed by a number represented by the least significant bits of the virtual memory address transmitted along the local address bus. In one example embodiment, the local address bus is connected to an address generating unit (AGU) 165 that communicates with the execution unit 107 and generates the virtual address.

The entries of the tag memory 130 contain the most significant bits of the physical memory address of data that is stored in the corresponding entry in cache memory 135. A cache "hit" occurs when the most significant address bits stored in the tag memory 130 entry that has the corresponding index match the most significant bits of the address generated by the AGU. When a cache "hit" occurs, the data is read from the corresponding entry in cache memory 135.

When data corresponding to a memory address is not stored in the cache memory 135, the tag entry at that index will not match the most significant bits of that address, which is referred to as a cache "miss." In case of a "miss" the data is obtained from system memory and loaded into cache memory 135. The MMU 140 then controls the data exchange between the cache memory 135 with the local execution unit 107 and system memory 155. Generally, the tag memory 130 can be divided into two types, depending on whether the tag corresponds to physical or virtual memory addresses. The tag memory 130 of embodiment as shown in FIG. 1 contains physical memory addresses. However, embodiments of the present disclosure also include tag memory 130 that contains virtual address tags. Similarly, example embodiments include virtual as well as physical indexes of tag memory. The advantage of virtually indexed and physically tagged cache memory is that the tag memory can be looked up in parallel with translating the virtual to the physical address, decreasing the latency of the cache access. However, the tag is not matched unless the MMU 140 completes translating the address.

In referring to FIG. 1, the memory management unit (MMU) controller 160 and the translation look-aside buffer (TLB) 165 facilitate the data exchange between the execution unit 107, the cache, and the system memory by translating the virtual memory address into the corresponding physical address of the system memory 155. Typically, virtual memory requires the computer system 100 to translate virtual addresses generated by the operating system including the kernel into physical addresses on the system memory. The component of the computer system 100 that performs this translation is the MMU. A fast translation route through the MMU 140 involves a table of translation mappings stored in the TLB 165, which is a cache of mappings from the operating system's page table that map virtual to physical addresses. The TLB 165 is used by the MMU 140 to increase the translation speed, since it only concerns a fast table-lookup operation.

TLB 165 stores portions of the mapping from virtual address to physical address. For instance, TLB 165 stores the mappings of recently accessed virtual addresses or frequently accesses virtual addresses. If a process requests to access data from a virtual address that is not present in the TLB (e.g., occurrence of a page miss), then a page walk is executed. Embodiments of the different caches of a TLB can be implemented as fully associative caches or n-way set associative caches (e.g., 4-way set associative). Additional description of TLB 165 is provided hereinbelow with reference to FIG. 2.

As used herein, a page walk is a process in which the computer system access the page table stored in system memory 155. During a page walk, different hierarchical levels of tables may be accessed in order to determine the mapping between the requested virtual address and the corresponding physical address. As a result, executing a page walk can be an expensive process.

In one example embodiment, the computer system 100 contains one or more TLBs dedicated to different translation operations. In another embodiment, a TLB 165 is exclusively utilized by the MMU 140 for paged virtual memory translations. In the example embodiment of FIG. 1, the TLB 165 includes content-addressable memory (CAM) that uses the virtual address as a CAM search key and generates a corresponding physical address as a search result. If the virtual address queried by the MMU 140 is available in the TLB 165, the CAM search quickly returns the matched physical address entry of the TLB 165 to be further used by the MMU 140. This is referred to as a "TLB hit." In case of a "TLB miss," meaning the queried address is not included the TLB 165 cache entries, the MMU 140 and related software proceeds with the translation by performing a page walk through the page table, which involves indexing to and loading from appropriate locations within the page table in system memory and computing the physical address from the fetched page table entry. After the page walk concludes by determining the corresponding physical address, the mapping of virtual to physical address is stored into the TLB 165 cache. Thus, a page walk is a compute intensive process, adding significantly to the latency of accessing memory in the system architecture. After completing the page walk and determining the physical address of the requested data, the data is supplied by the cache, if present there, or accessed directly from system memory.

In case of a TLB hit, the MMU 140 passes the translated physical address back to the tag memory 130 for comparing the address with indexed tag entry in the tag memory 130. In case of a cache hit, the tag memory 130 passes a signal to the cache memory 135 and the MMU 140 to indicate that the memory address generated by the AGU 165 resides in the cache data memory. Subsequently the MMU 140 directly loads the data identified by the hit from the cache data memory and transmits the data along the local data bus 115 to the execution unit 107. However, in case of a cache miss, the MMU 140 retrieves the data from the system memory 155 over the system bus utilizing the MMU controller 160 and the TLB 165 as described above.

Translation Look-Aside Buffer

Figure 2:
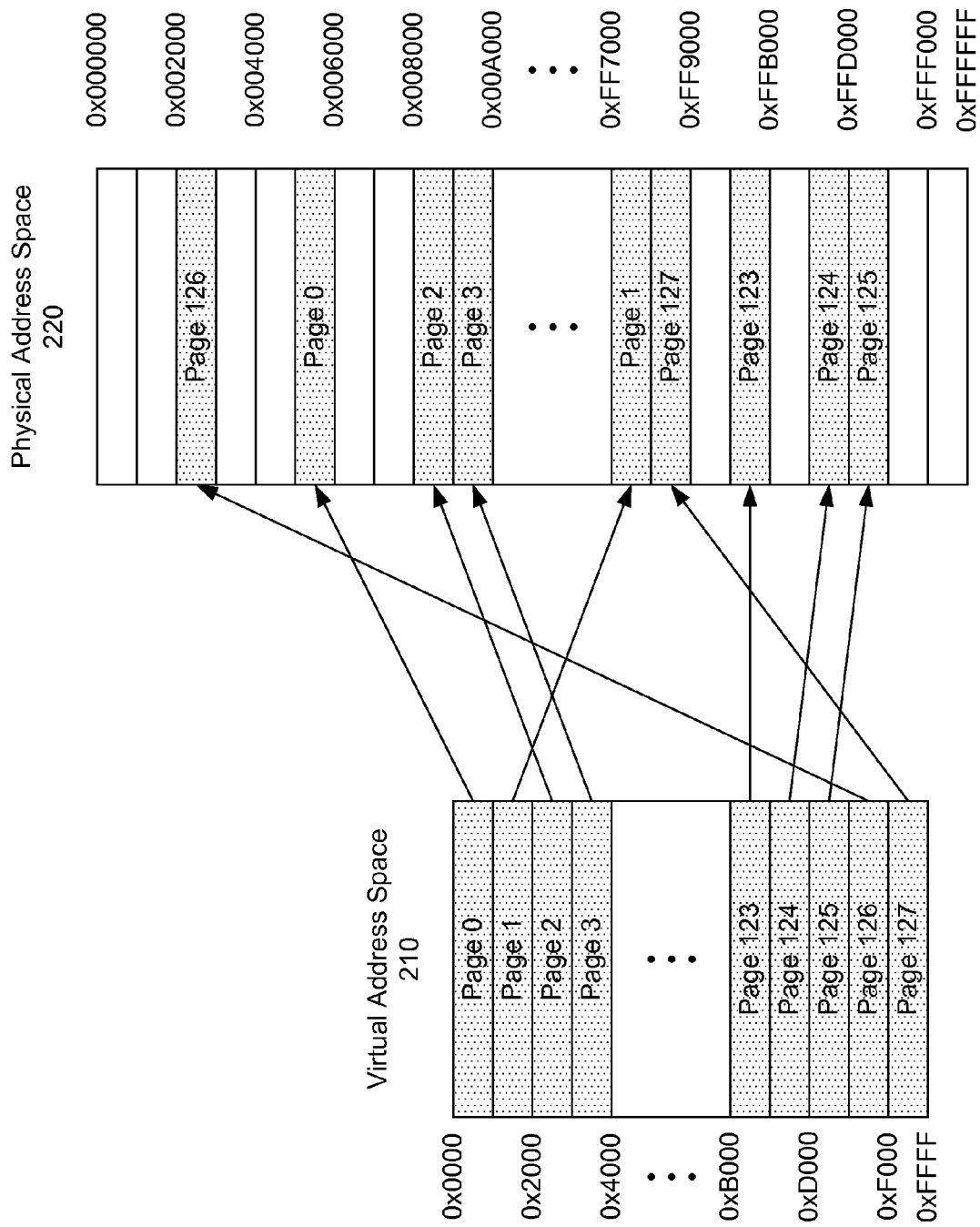
FIG. 2 illustrates a mapping between a virtual address space and a physical address space, according to one embodiment.

FIG. 2 illustrates a mapping between a virtual address space and a physical address space. When processes running on a computer system requests for storage space in system memory, the requested memory may be allocated for the process and a virtual address may be given to the allocated memory. For instance, as illustrated in FIG. 2, after a process request for system memory, 128 pages of system memory may be allocated by the computer system. Depending on the availability of the pages and the configuration of the computer system, different pages at different physical addresses may be allocated for the process that requested the 128 pages. In the exemplary embodiment of FIG. 2, page 0 was allocated at physical address 0x005000, page 1 was allocated at physical address 0xFF7000, page 2 was allocated at physical address 0x008000, etc. The computer system assigns virtual addresses to the allocated pages and stores the mapping from virtual address to physical address in a region of system memory called the page table. For instance, page 0 was assigned a virtual address of 0x0000, page 1 was assigned a virtual address of 0x1000, page 2 was assigned a virtual address of 0x2000, etc.

In some embodiments, the management of the page table is done in software (e.g., by the operating system of the computer system). The operating system sends instructions to a processor of the computer system, which in turn, inserts entries in the page table stored in system memory.

In other embodiments, the management of the page table is performed in hardware. The MMU 140 populates the entries of the page table stored in system memory when a page of system memory is allocated.

In some cases, a software managed page table is more flexible than a hardware managed page table, since the way virtual address and pages are assigned can be modified by modifying the software managing the page table. Alternatively, a hardware managed page table is faster than a software managed page table because circuitry dedicated to manage the page tables may be added to the MMU 140 of the computer system.

When a process requests to read data from a specific virtual address, the corresponding physical address is determined and the data from the determined physical address is retrieved. For example, if the process requests to read the data from virtual address 0xF600, the computer system determines that virtual address 0xF600 maps to physical address 0xFA1600 and retrieves the data stored at that physical memory location. One way to determine that virtual address 0xF600 maps to physical address 0xFA1600 is to perform a process called a page table walk.

During a page table walk, the computer system accesses the page table and locates the mapping of the virtual address in the page table. Depending on the configuration of the page table, multiple levels of tables may be accesses before the mapping is found. Thus, page walking may be an expensive process since it may be executed using multiple clock cycles.

Another way to determine the mapping of the virtual address is to search for the mapping in the translation look-aside buffer (TLB) 165.

In one embodiment, the TLB 165 is a single cache that stores both data address translations and instruction address translations. In another embodiment, the TLB 165 includes multiple caches. For instance the TLB 165 includes a "normal page" TLB (NTLB), a "super page" TLB (STL), an instruction μTLB (ITLB), and a data μTLB (DTLB). In yet other embodiments, the TLB 165 may include additional or fewer caches than the ones described above. For instance, a TLB may include one cache that stores translations for both data and instructions.

The ITLB stores a cache of the translation from virtual address to physical address of instructions stored in system memory and the DTLB stores a cache of the translation from virtual address to physical address of data stored in system memory. The ITLB and the DTLB are a first level cache in a two level or a multi level TLB. The ITLB and the DTLB are usually small in size and are accessible with a small amount of latency.

The NTLB and the STLB are a second level cache in a two level TLB which supports multiple page sizes. The NTLB stores translations of "normal pages." The STLB stores translations of "super pages." A "normal page" is a page in a page table with a smaller entry size. For instance, a "normal page" may be 4 kilobytes in size. A "super page" is a page in a page table with a larger entry size. For instance, a "super page" may be 4 megabytes in size. Including multiple caches that support multiple page sizes increases the coverage of the TLB 165. The NTLB and the STLB are typically larger in size than the ITLB and the DTLB and may be accessed if the requested virtual address is not present in the ITLB or the DTLB. Due to the larger size, the NTLB and the STLB may have a larger latency than the ITLB and the DTLB.

As previously discussed with reference to FIG. 1, the management of the TLB 165 may be performed in either software (e.g., by the operating system of the computing system) or hardware. In a hardware managed TLB, when a page miss occurs, the TLB performs a page walk to retrieve the mapping of the requested virtual address. A software managed TLB has a greater flexibility than a hardware managed TLB since the software specifies how to perform the page walk. As a result, the same TLB 165 may be used for systems with different memory configurations. Alternatively, a hardware managed TLB is faster than a software managed TLB because in a software TLB, certain TLB 165 operations are performed using multiple software commands. Furthermore, the instructions to perform the operations to manage the TLB 165 may be stored in system memory 155 and may be retrieved before the execution of the operation can be performed.

In order to increase the speed of a software managed TLB, while maintaining its flexibility, certain maintenance operations (e.g., insert, delete, search, etc) may be atomically performed in hardware with a single software instruction. Additionally, the software (e.g., operating system) does not need to know details of the implementation of the MMU 140. The software may provide virtual address to physical address mapping information (e.g., virtual address, physical address, process ID) and the MMU 140 performs the steps to insert the mapping into the TLB 165 (e.g., delete previous copies of the mapping, select a TLB entry to store the mapping, store the mapping in the selected entry, etc). As a result, the TLB 165 maintains much of the flexibility of a software managed TLB, and achieves performance and speed comparable to hardware managed TLBs.

For instance, in a software managed TLB, to insert a new TLB entry, several instructions are executed. First TLB entries are searched for a matching entry. If matching entries are found, the matching entries are deleted from the TLB 165. The new entry is written in the appropriate section of the TLB 165. A determination is made whether to copy the entry into the ITLB or the DTLB and copying the entry into the appropriate cache.

Figure 3:
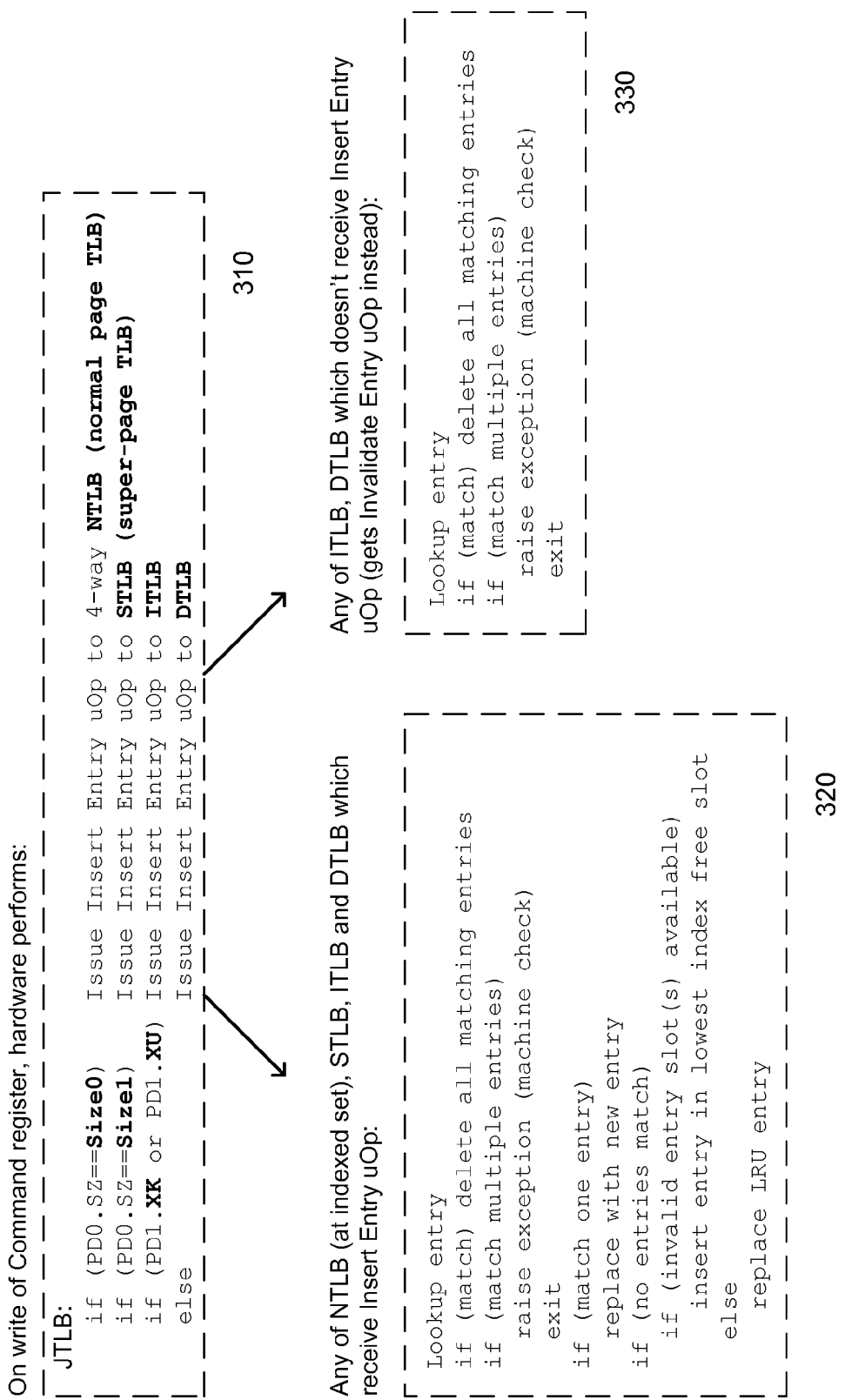
FIG. 3 illustrates the steps executed by a memory management unit when inserting a new TLB entry, according to one embodiment.

To increase the speed of a software managed TLB, some of the instructions for inserting a new TLB entry may be executed with a single software command. FIG. 3 illustrates the steps 310 executed by the MMU 140 when inserting a new TLB entry, according to one embodiment. In other embodiment, additional or fewer steps are performed by the MMU 140 when inserting a new TLB entry. If the MMU 140 determines the new page is a normal page (PD0.SZ==Size0), the entry is inserted 320 in the NTLB. If the MMU 140 determines that the new page is a super page (PD0.SZ==Size1), the entry is inserted 320 in the STLB. Additionally, the MMU 140 may determine to insert 320 the entry in the ITLB or the DTLB. If the new entry is not inserted in the ITLB and/or the DTLB, the entry may be searched in the ITLB and/or the DTLB and if found, the entry may be deleted 330.

FIG. 3 additionally illustrates an example of the operations performed by the MMU 140 to insert 320 a new entry, according to one embodiment. The entry is searched in the caches and all matching entries are deleted. If multiple matching entries are found, an exception may be raised. If only one matching entry is found, the new entry may be inserted where the matching entry was found. If a matching entry is not found, the entry may be inserted in a free entry. If a free entry is not available, the least recently used entry may be replaced by the new entry.

By allowing the operating system to walk the page table and insert the entry into the TLB when a page miss occurs, the TLB can be used with a variety of memory configurations since the way the page table is walked and the data inserted into the TLBs are controlled by the operating system. Additionally, the operating system does not need to check for consistency and duplicate entries in the TLB since during the insert operation, the MMU performs the checks and deletes any duplicate entries. Additionally, the operating system does not need to send instructions to determine in which entry to store the mappings from virtual address to physical address since these operations are performed by MMU.

FIG. 4 illustrates an example of the steps 410 executed by the MMU 140 when deleting a TLB entry, according to one embodiment. In other embodiments, additional or fewer steps are performed by the MMU 140 when deleting a TLB entry. If the MMU 140 determines that the entry to be deleted is a normal page (PD0.SZ==Size0), the entry is deleted 420 from the NTLB. If the MMU 140 determines that the entry to be deleted is a super page (PD0.SZ==Size1), the entry is deleted 420 from the STLB. Additionally, the MMU 140 may delete any matching entries from the ITLB and the DTLB.

To delete an entry from either the NTLB, STLB, ITLB, or DTLB, the entry to be deleted is searched in the appropriate cache. If a match is found, the matching entry is deleted. Additionally, if multiple matches are found, an exception may be raised.

In some embodiments, the TLB 165 may execute conventional TLB commands as well as atomic TLB maintenance commands. This way, the TLB 165 may retain the full flexibility of a software managed TLB while improving the performance and speed of TLB maintenance operations.

Figure 5:
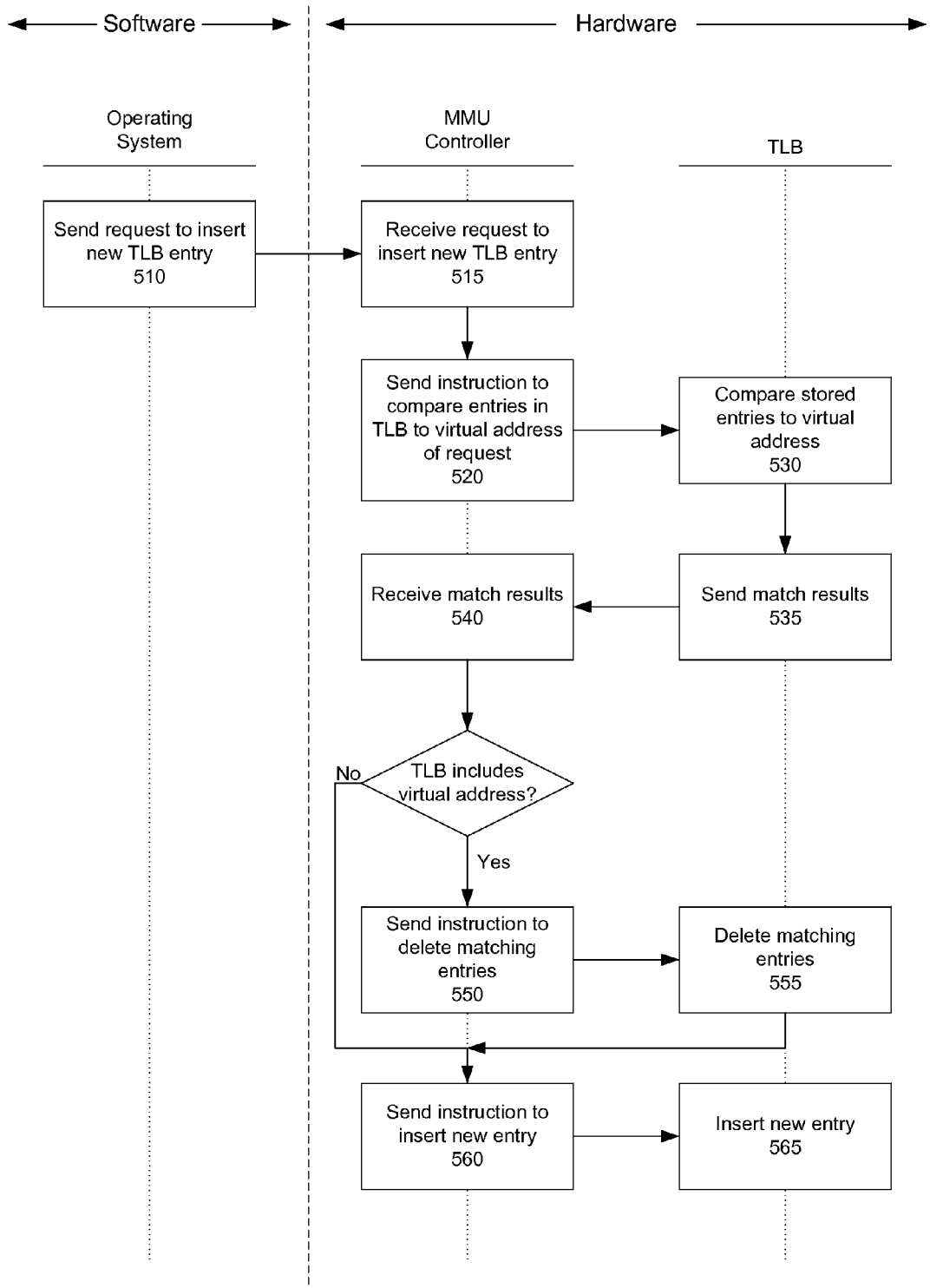
FIG. 5 illustrates an exemplary flow diagram of a process for inserting a new entry in a TLB, according to one embodiment.

FIG. 5 illustrates an exemplary flow diagram of a process for inserting a new entry in a TLB 165. The operating system of the system sends 510 a request to the MMU controller 160 to insert a new TLB entry. The request sent by the operating system includes a virtual address of the entry to be inserted and a physical address associated with the virtual address. The MMU controller 160 receives 515 the request to insert the new TLB entry and sends 520 an instruction to TLB 165 to compare the entries stored in the TLB 165 to the virtual address included in the request. The TLB 165 compares 530 the stored entries to the virtual address and sends 535 the matching results to the MMU controller 160.

The MMU controller 160 receives 540 the match results from the TLB 165. Based on the results received from the TLB 165, the MMU controller 160 determines whether TLB 165 includes one or more entries associated with the virtual address of the request received from the operating system. If the TLB 165 includes one or more entries associated with the virtual address, the MMU controller 160 sends 550 and instruction to TLB 165 to delete the matching entries and upon receiving the request, TLB 165 deletes 555 the matching entries. After TLB 165 deleted the entries, or if TLB 165 does not include an entry associated with the virtual address, the MMU controller 160 sends 560 an instruction to the TLB 165 to insert the new TLB entry. In some embodiments, the prior to sending the request to insert the new TLB entry, the operating system performs a page walk to determine the physical memory address associated with the virtual address to be inserted in to the TLB 165.

Figure 6:
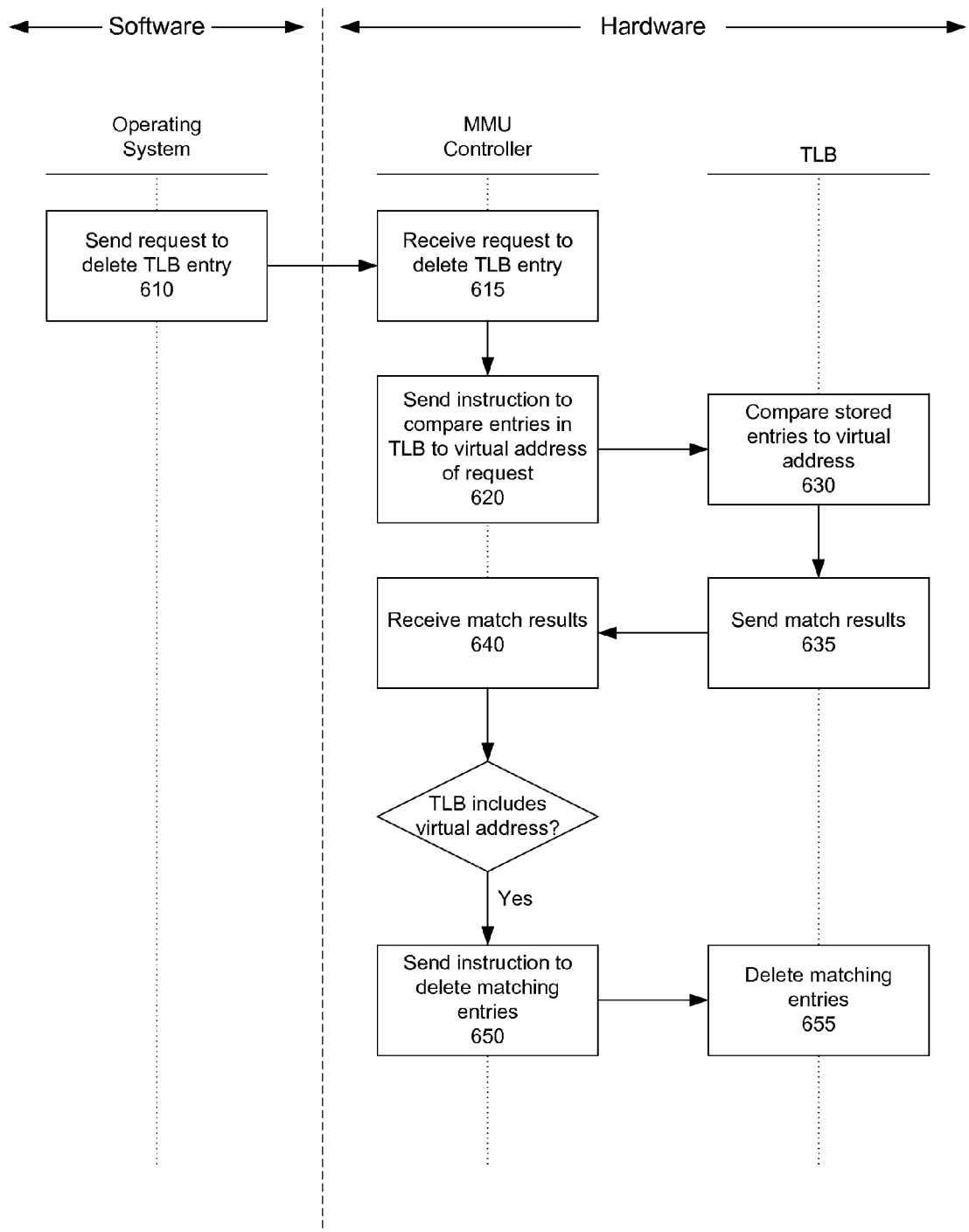
FIG. 6 illustrates an exemplary flow diagram of a process for inserting a new entry in a TLB, according to one embodiment.

FIG. 6 illustrates an exemplary flow diagram of a process for inserting a new entry in a TLB 165. The operating system of the system sends 610 a request to the MMU controller 160 to delete a TLB entry. The request sent by the operating system includes a virtual address of the entry to be inserted. The MMU controller 160 receives 615 the request to delete the TLB entry and sends 620 an instruction to the TLB 165 to compare the entries stored in the TLB 165 to the virtual address included in the request. The TLB 165 compares 630 the stored entries to the virtual address and sends 635 the matching results to the MMU controller 160.

The MMU controller 160 receives 640 the match results from the TLB 165. Based on the results received from the TLB 165, the MMU controller 160 determines whether TLB 165 includes one or more entries associated with the virtual address of the request received from the operating system. If the TLB 165 includes one or more entries associated with the virtual address, the MMU controller 160 sends 650 an instruction to TLB 165 to delete the matching entries and upon receiving the request, the TLB 165 deletes 655 the matching entries.

Computing Machine Architecture

Figure 7:
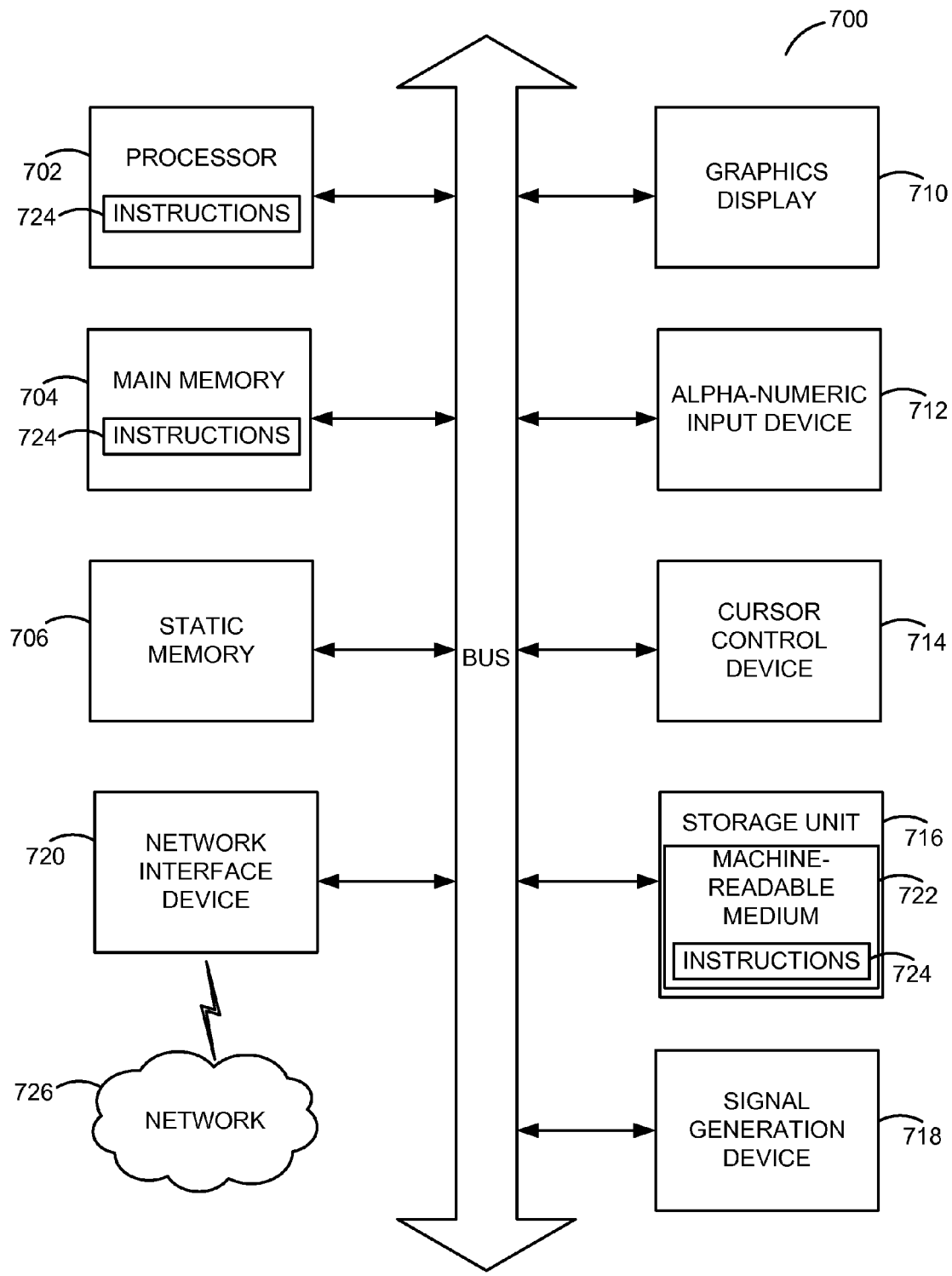
FIG. 7 is a block diagram illustrating components of an example machine able to read instructions from a machine-readable medium and execute them in a processor (or controller), according to one embodiment.

FIG. 7 is a block diagram illustrating components of an example machine able to read instructions from a machine-readable medium and execute them in a processor (or controller). Specifically, FIG. 7 shows a diagrammatic representation of a machine in the example form of a computer system 700 within which instructions 724 (e.g., software) for causing the machine to perform any one or more of the methodologies discussed herein may be executed. The computer system 700 may be used to perform operations associated with designing a test circuit including a plurality of test core circuits arranged in a hierarchical manner.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704 and a static memory 706, which are configured to communicate with each other via a bus 708. The computer system 700 may further include graphics display unit 710 (e.g., a plasma display panel (PDP), a liquid crystal display (LCD), a projector, or a cathode ray tube (CRT)). The computer system 700 may also include alphanumeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720. The machine-readable medium 722 may also store a digital representation of a design of a test circuit.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

What is claimed is:

1. A memory management unit (MMU) for storing mappings between virtual addresses and physical addresses, the MMU comprising:
   a translation look-aside buffer (TLB) configured to store mappings between virtual address and physical address; and
   a memory management unit (MMU) controller configured to:
      receive a request to insert an entry into the TLB, the request comprising a virtual address and a physical address, and
      responsive to receiving the request to insert the entry:
         determining whether a stored entry in the TLB matches the virtual address of the requested entry by comparing the virtual address of the requested entry to a virtual address associated with each stored entry in the TLB;
         responsive to determining that the stored entry matches the virtual address of the requested entry, replacing the stored entry with the requested entry; and
         responsive to determining that the stored entry does not match the virtual address of the requested entry determining a location in the TLB to insert the requested entry.

2. The MMU of claim 1, wherein determining the location in the TLB to insert the requested entry comprises:
   determining that the TLB includes an available location; and inserting the requested entry into the available location.

3. The MMU of claim 1, wherein determining the location in the TLB to insert the requested entry comprises:

determining that the TLB does not include an available location; and replacing a least recently used entry stored in another location of the TLB with the requested entry.

4. The MMU of claim 1, wherein the request is a single software instruction.

5. The MMU of claim 4, wherein the request is received from an operating system.

6. The MMU of claim 1, wherein the TLB comprises a data cache and an instruction cache, the data cache configured to store mappings between virtual addresses and physical addresses of data entries, and the instruction cache configured to store mappings between virtual addresses and physical addresses of instruction entries.

7. The MMU of claim 1, wherein the TLB comprises one or more content addressable memories (CAMs) and wherein responsive to receiving the request to insert the requested entry, the MMU controller is configured to:

determine whether an entry in the CAMs matches the virtual address of the requested entry by comparing the virtual address of the requested entry and a virtual address of each entry of the CAM.

8. The MMU of claim 1, wherein the TLB is a single level cache.

9. The MMU of claim 1, wherein the TLB is a multi level cache.

10. The MMU of claim 1, wherein the TLB includes a first TLB storing entries with a first entry size, and a second TLB with a second entry size, and wherein responsive to receiving the request to insert the requested entry, the MMU controller is further configured to:

determine a size of the requested entry to be inserted; and
responsive to determining that the requested entry has the first entry size:
  determining whether one or more entries in the first TLB are associated with the virtual address of the received request,
  responsive to determining that one or more entries in the first TLB are associated with the virtual address, removing the one or more entries associated with the virtual address, and
  inserting the requested entry into the first TLB.

11. The MMU of claim 10, wherein the MMU controller is further configured to:

responsive to determining that the requested entry has the second entry size:
  determining whether one or more entries in the second TLB are associated with the virtual address of the received request,
  responsive to determining that one or more entries in the second TLB are associated with the virtual address, removing the one or more entries associated with the virtual address, and
  inserting the new entry into the second TLB.

12. A non-transitory computer-readable medium comprising instructions that when executed by a processor cause the processor to generate a digital representation of a memory management unit (MMU), the digital representation of the MMU comprising:

a translation look-aside buffer (TLB), the TLB configured to store mappings between virtual address and physical address; and a memory management unit (MMU) controller, the MMU controller configured to:
  receive a request to insert an entry into the TLB, the request including a virtual address and a physical address, and
  responsive to receiving the request to insert the entry:
    determining whether a stored entry in the TLB matches the virtual address of the requested entry;
    responsive to determining that the stored entry matches the virtual address of the requested entry, replacing the stored entry with the requested entry; and
    responsive to determining that the stored entry does not match the virtual address of the requested entry, determining a location in the TLB to insert a mapping between the virtual address and the physical address of the requested entry.

13. The non-transitory computer readable medium of claim 12, wherein determining the location in the TLB to insert the mapping between the virtual address and the physical address of the requested entry comprises:

determining that the TLB includes a free entry; and
inserting the mapping into the free entry.

14. The non-transitory computer readable medium of claim 12, wherein determining the location in the TLB to insert the mapping between the virtual address and the physical address of the requested entry comprises:

determining that the TLB does not include a free entry; and
replacing a least recently used entry with the mapping.

15. The non-transitory computer readable medium of claim 14, wherein the request is a single software instruction.

16. The non-transitory computer readable medium of claim 14, wherein the MMU controller is further configured to:

receive a request to delete an entry of the TLB, the request to delete the entry comprising a virtual address and a physical address; and
responsive to receiving the request to delete the entry:
  determine whether a first entry, stored in the TLB, is associated with the virtual address of the request; and
  responsive to determining that the first entry is associated with the virtual address of the request, remove the first entry.

* * * * *